United States Patent [19]

Broadway et al.

[11] 3,794,870
[45] Feb. 26, 1974

[54] THREE-PHASE, POLE-CHANGING MOTOR

[75] Inventors: Alexander Richard William Broadway; William Fong; Gordon Hindle Rawcliffe, all of Bristol, England

[73] Assignee: National Research Development Corporation, London, England

[22] Filed: July 17, 1972

[21] Appl. No.: 272,669

[30] Foreign Application Priority Data

May 19, 1972 Great Britain.................. 23,667/72

[52] U.S. Cl................. 310/180, 310/198, 310/202, 310/208, 318/224
[51] Int. Cl. ............................................. H02k 3/00
[58] Field of Search ... 310/198, 179, 180, 184, 200, 310/188, 202, 203, 204, 205, 206, 207; 318/224

[56] References Cited
UNITED STATES PATENTS

| | | | |
|---|---|---|---|
| 3,673,477 | 6/1972 | Broadway | 310/202 |
| 3,299,337 | 1/1967 | Rawcliffe | 310/202 |
| 3,175,142 | 3/1965 | Rawcliffe | 310/224 |
| 3,515,922 | 6/1970 | Fong | 310/198 |
| 3,470,409 | 9/1969 | Scheda | 310/202 |
| 3,443,183 | 5/1969 | Pagano | 310/198 |
| 3,335,307 | 8/1967 | Levy | 310/202 |

*Primary Examiner*—R. Skudy
*Attorney, Agent, or Firm*—Larson, Taylor & Hinds

[57] ABSTRACT

A three-phase, alternating current, speed-changing electric motor, or generator, suitable for six-terminal, series/parallel switching and with pole-changing effected by pole-amplitide modulation, having a composite three-phase stator winding comprising two component windings with corresponding phase-winding parts connected in the same phase of the composite winding and spaced apart from each other around the winding periphery. Most commonly the spacing is uniform.

13 Claims, 28 Drawing Figures

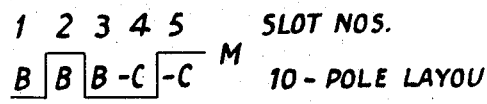
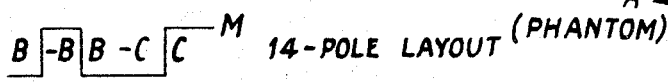
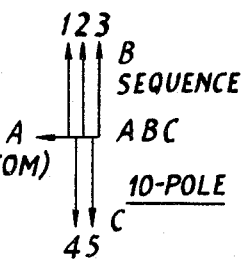
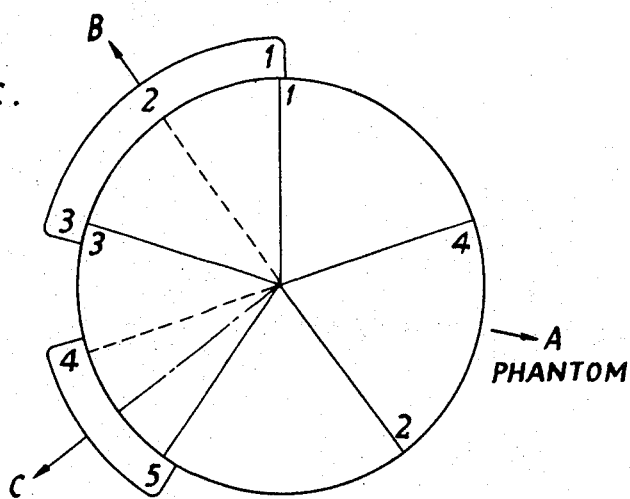
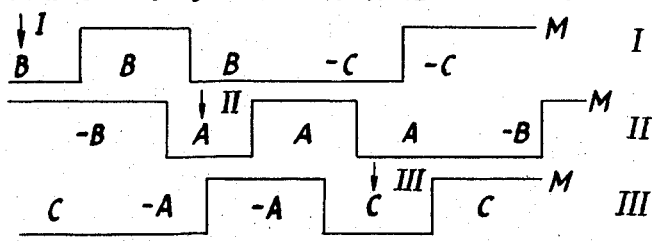

FIG. 4
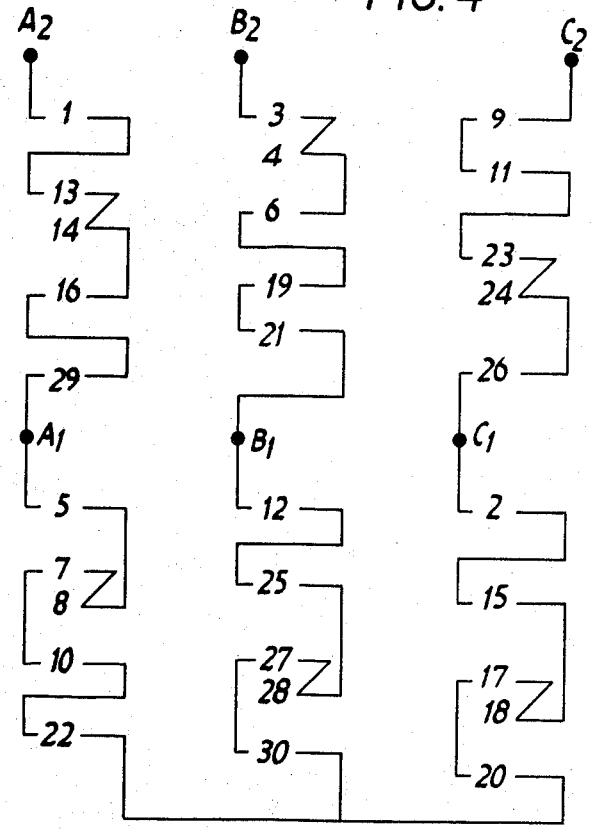
FIG. 8.
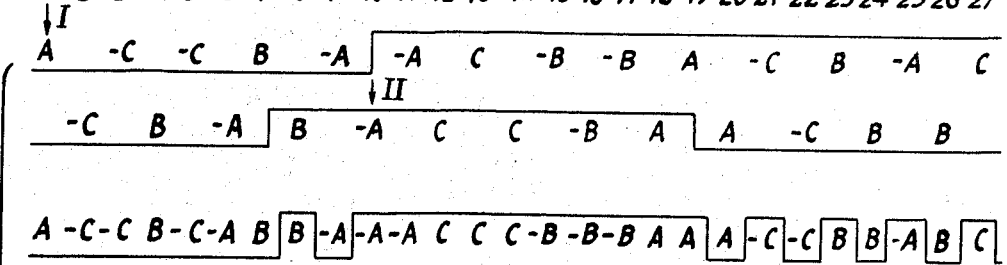
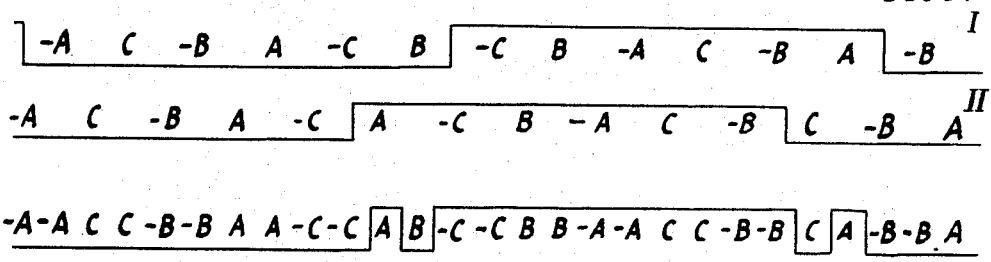
RESULTANT 6-POLE LAYO

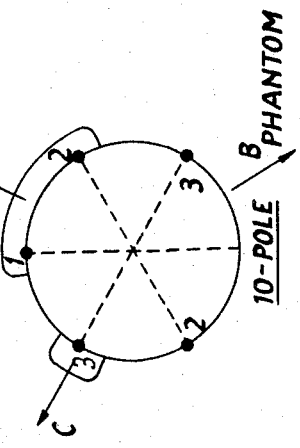
FIG. 5a.
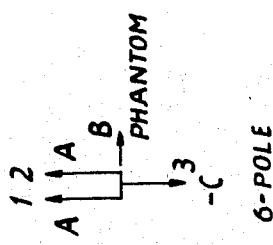
FIG. 5b.
FIG. 5c.
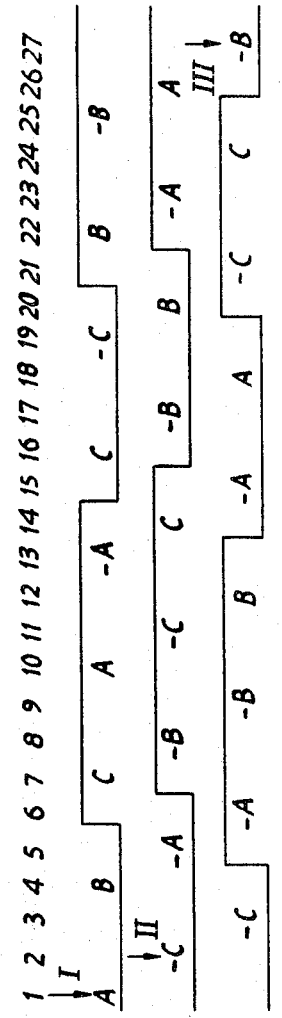
FIG. 6.
FIG. 7.
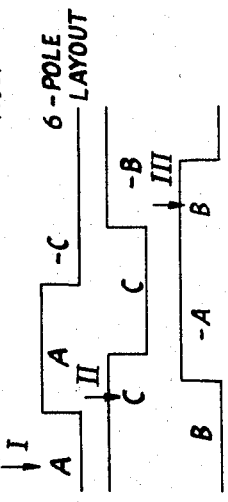
(TWO 27-SLOT WINDINGS ARE PARALLELED IN 54 SLOTS, AT 9 SLOTS SPACING)

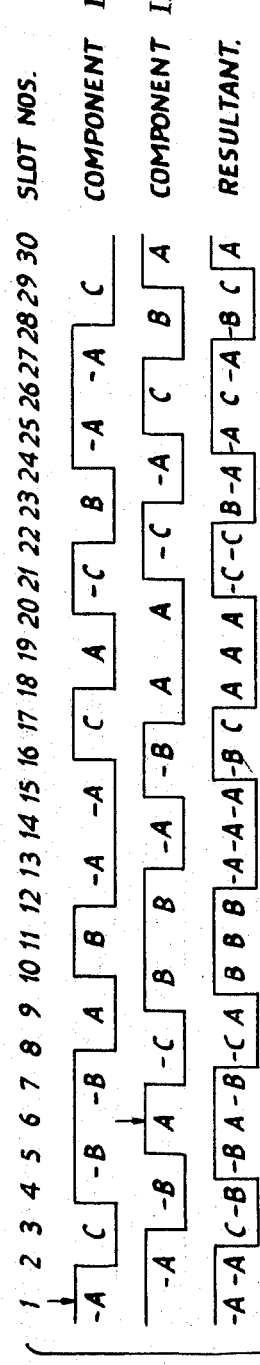
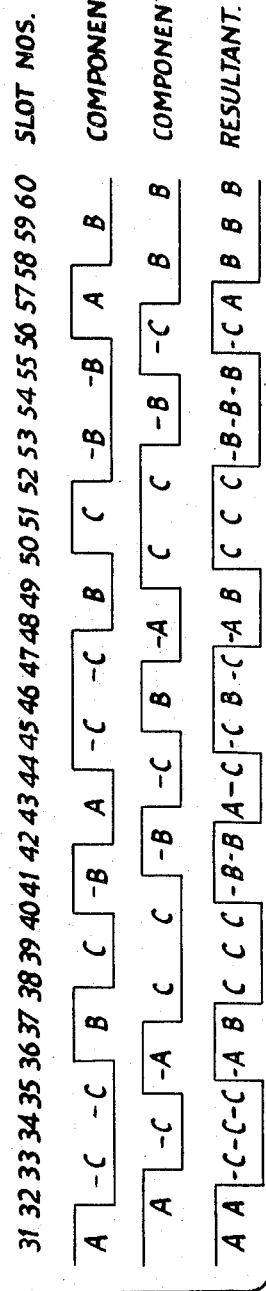
FIG. 9.

FIG. 11

| Slot Nos. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 45-slot winding | −B | −B | A | A | −C | −C | B | B | −A | −A | C | C | B | B | −A | A | −C | −C | B | B | −A | −A | C | C | −B | −B | A | A | −C | −C | B | B | −A | −A | C | C | −B | −B | A | A | −C | −C | B | B | −A |

8-POLE LAYOUT

FIG. 12

8-POLE LAYOUTS

| Slot Nos. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| I | −B | | A | | −C | | B | | −A | | C | | B | | −A | | −C | | B | | −A | | C | | −B | | A | | −C | | B | | −A | | C | | −B | | A | | −C | | B | | −A | |
| II | | −B | | A | | −C | | B | | −A | | C | | B | | −A | | −C | | B | | −A | | C | | −B | | A | | −C | | B | | −A | | C | | −B | | A | | −C | | B | | −A |
| Resultant winding | −B | −B | A | A | −C | −C | B | B | −A | −A | C | C | B | B | −A | −A | −C | −C | B | B | −A | −A | C | C | −B | −B | A | A | −C | −C | B | B | −A | −A | C | C | −B | −B | A | A | −C | −C | B | B | −A |

| Slot Nos. | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | 77 | 78 | 79 | 80 | 81 | 82 | 83 | 84 | 85 | 86 | 87 | 88 | 89 | 90 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| I | −B | | A | | −C | | B | | −A | | C | | B | | −A | | −C | | B | | −A | | C | | −B | | A | | −C | | B | | −A | | C | | −B | | A | | −C | | B | | −A | |
| II | C | | −B | | A | | −C | | B | | −A | | −C | | B | | −A | | C | | −B | | A | | −C | | B | | −A | | C | | −B | | A | | −C | | B | | −A | | C |
| Resultant winding | C | −B | −B | A | A | −C | −C | B | B | −A | −A | −C | −C | B | B | −A | −A | C | C | −B | −B | A | A | −C | −C | B | B | −A | −A | C | C | −B | −B | A | A | −C | −C | B | B | −A | −A | C | C | C |

COIL-PITCH: 8 SLOTS (1-9 ETC.)
8 POLES, PARALLEL-STAR: SUPPLY A1, B1, C1.
JOIN A2, B2, C2.

12 POLES, SERIES-STAR: SUPPLY A2, B2, C2.
ISOLATE A1, B1, C1.

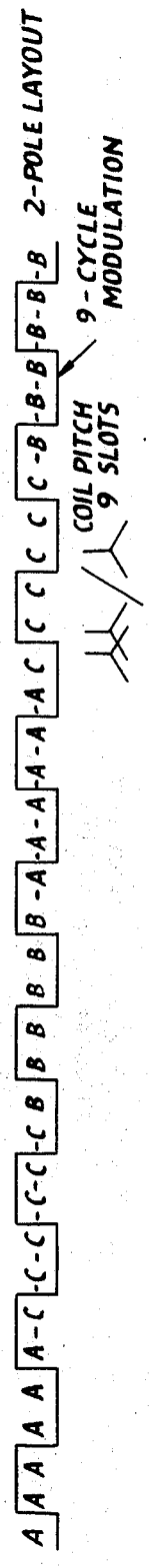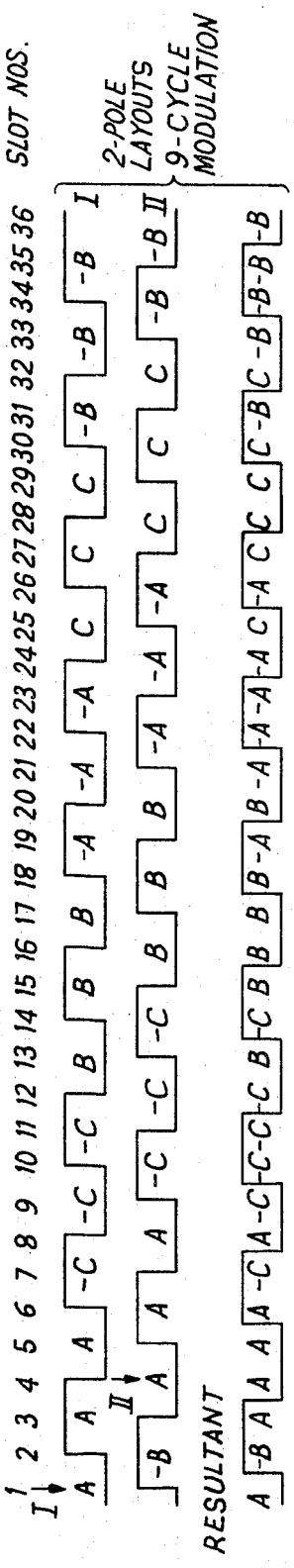
FIG. 20.
FIG. 21.
FIG. 22.

FIG. 23.

1 2 3 4 5 6 7 8 9 10 11 12 13 14 15 16 17 18   SLOT NOS.

| A | A | -C | -C | -C | B | B | B | -A | -A | -A | C | C | C | -B | -B | -B |

2-POLE LAYOUT

FIG. 24.

1 2 3 4 5 6 7 8 9 10 11 12 13 14 15 16 17 18 19 20 21 22 23 24 25 26 27 28 29 30 31 32 33 34 35 36   SLOT NOS.

I

| A | A | -C | -C | -C | B | B | B | -A | -A | -A | C | C | C | -B | -B | -B |

II

| A | -C | -C | B | B | -A | -A | C | C | -B | -B | A | A | -C | -C | B | B | -A | -A | C | C | -B | -B | A |

RESULTANT

| A | A | -C | -C-C | -C | B | B-B | B | -A-A | -A | -A | C | C-C | C | -B-B | -B | -B | A |

3,794,870

THREE-PHASE, POLE-CHANGING MOTOR

This invention relates to three-phase, alternating current, speed-changing electric motors and generators, in which speed-changing is effected by the method of pole-amplitude modulation, (PAM).

The method of speed-changing by pole-amplitude modulation has been described in papers by Professor G.H. Rawcliffe and others, the first entitled "Induction Motor Speed-Changing by Pole-Amplitude Modulation" in the Proceedings of the Institution of Electrical Engineers, Vol. 105, Part A, No. 22, August, 1958, and a second entitled "Speed-Changing Induction Motors — Further Development in Pole-Amplitude Modulation" in the Proceedings of the Institution of Electrical Engineers, Vol. 107, Part A, No. 36, December, 1960.

The method has been further described and defined in U.S. Pat. specifications No. 900,600, No. 926,101, No. 986,384, No. 968,988, No. 986,379, No. 988,726, No. 1,133,062, No. 1,152,499 and others.

The object of the present invention is to provide further improved electric machines in which speed-changing is effected by pole-amplitude modulation.

It is known, for example from U.S. Pat. specification No. 1,133,062, to provide a three-phase machine having a stator winding comprising three similar winding components, each component itself comprising three phase-windings and each component by itself being suitable for use as the stator winding of a three-phase machine, even though the machine might not be satisfactory in respect of the resultant magnetomotive force waveform. In that specification the composite stator windings described were assembled by arranging a particular phase-winding of the component winding to be in phase A for the first component, phase B for the second component and phase C for the third component. The resultant composite winding was thus exactly balanced with respect to all three phase-windings.

The present invention is distinguished by a composite three-phase stator winding comprising two component windings having their corresponding phase-windings arranged in the same phase of the resultant composite winding but spaced-apart from each other around the winding.

In order that the invention may be clearly understood and readily carried into practice, a number of embodiments thereof will now be described in detail, by way of example, with reference to the accompanying drawings, in which:

FIG. 1a is a layout diagram of a three-phase, 10-pole/14-pole winding element wound in five slots;

FIG. 1b is a slot-vector diagram for the 10-pole connection of the winding element of FIG. 1a;

FIG. 1c is a slot-vector diagram for the 14-pole connection of the winding element of FIG. 1a;

FIG. 2 is a layout diagram of a 10-pole/14-pole winding in 15 slots;

FIG. 4 is a winding diagram showing the alternative parallel/series connections of the winding of FIG. 3 for 10-pole/14-pole working;

FIG. 5a is a layout diagram of a three-phase, six-pole/10-pole winding element wound in three slots;

FIG. 5b is a slot-vector diagram for the six-pole connection of the winding of FIG. 5a;

FIG. 5c is a slot-vector diagram for the 10-pole connection of the winding of FIG. 5a;

FIG. 6 is a layout diagram of a six-pole/10-pole winding in nine slots;

FIG. 7 is a layout diagram of a six-pole/10-pole winding in 27 slots;

FIG. 8 is a layout diagram of a derived six-pole/10-pole winding in 54 slots;

FIG. 9 is a layout diagram of a 10-pole/14-pole winding in 60 slots, showing the two 30-slot components;

FIG. 11 is a layout diagram of an eight-pole/12-pole balanced winding in 45 slots;

FIG. 12 is a layout diagram of an eight-pole/12-pole winding in 90 slots, comprising two component windings according to FIG. 11;

FIG. 20 is a layout diagram of a known two-pole/20-pole winding in 36 slots;

FIG. 21 is a layout diagram of a two-pole/20-pole component winding in 18 slots;

FIG. 22 is a layout diagram of a two-pole/20-pole winding in 36 slots, comprising two component windings according to FIG. 21;

FIG. 23 is a layout diagram of a two-pole/24-pole winding component in 18 slots;

FIG. 24 is a layout diagram of a two-pole/24-pole winding in 36 slots, comprising two component windings according to FIG. 23;

Figure 3:
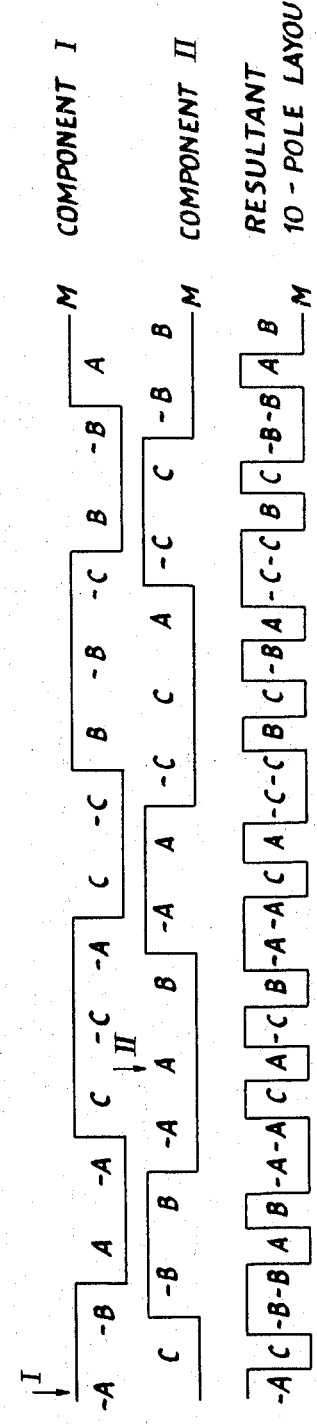
FIG. 3 is a layout diagram of a derived 10-pole/14-pole winding in 30 slots.

A first embodiment of the invention provides machines having a composite stator winding comprising two component windings interleaved, thus providing parallel circuits.

It is now recognized that there are two stages in the design of a PAM winding. The first stage is to arrange the coil-grouping of the winding and the overall modulating wave applied to the winding coils so that a winding layout of good m.m.f. waveform is provided for both in the working pole-numbers. The second stage is to effect the switching of coils, according to the modulating wave decided upon, using only six-terminal series/parallel switching.

In previously-described PAM windings, both stages of design have been effected simultaneously. However, this process is not possible for all windings. For some windings, it is necessary to add the switching facility after a balanced winding has been designed.

Examples of the separate-stage design process will be described with particular reference to six-pole/10-pole and 10-pole/14-pole windings. However, other pole-number combinations are also described.

As a preliminary to such description, however, it should be recognized that the trigonometrical equations, upon which the theory of pole-amplitude modulation is based, are of quite general validity.

These equations are stated in the technical articles and prior patent specifications referred to above and do not require repetition herein.

Thus, any three-phase, or polyphase, winding of whatever pole-number can be converted to a winding for any other pole-number by effecting selected coil reversals according to an appropriate overall modulation wave which PAM theory requires. "Overall" modulation, which is distinguished from the earlier-described "phase-by-phase" modulation, is described in prior U.S. Pat. specification No. 968,988.

However, the mere application of PAM theory to provide a speed-changing winding would, for some alternative pole-numbers, provide very complicated coil-switching. The practical value of PAM speed-changing windings previously described has resulted from the design of windings requiring only simple, six-terminal, series/parallel switching to apply the PAM theory.

Fortunately, this simple form of switching is readily applicable to the widely-used, close-ratio, pole-number combinations, such as four-poles/six-poles, six-poles/eight-poles, eight-poles/10-poles.

Certain other useful pole-number combinations, such as six-poles/10-poles and 10-poles/14-poles, are not easily achieved by simple six-terminal switching.

It is now seen that the possibility of applying six-terminal switching in a simple manner is determined by whether odd-cycle or even-cycle overall modulation is required.

"Odd-cycle" and "even-cycle" are terms which refer to the number of cycles in the overall modulation wave and denote an odd number of cycles and an even number, respectively. The significance of the terms is as explained, for example, in prior U.S. Pat. specification No. 986,379.

Thus, it has been established that modulation is always effected by applying, to the basic winding providing one required pole-number, an overall modulation wave which has a number of cycles which is equal to the sum (or the difference, but more usually the sum) of the numbers of pole-pairs for the said one required pole-number and for the second required pole-number.

With odd-cycle modulation, every pair of coils of a winding which lie diametrically opposite to each other are oppositely affected when the winding is switched to the modulated condition. That is to say, one coil is reversed and the other is not. In consequence, six-terminal, series/parallel switching is readily used.

With even-cycle modulation, every pair of coils of a winding which lie diametrically opposite to each other are similarly affected by modulation. This is to say, if one coil is reversed, so is the other. In consequence six-terminal series/parallel switching cannot be directly applied.

For the widely-used, close-ratio, pole-number combinations of four-poles/six-poles, six-poles/eight-poles and so on the difference or sum, always has a value of ±1 or ($2n±1$) where $n$ is the original number of pole-pairs. Such difference or sum is always odd, so that odd-cycle modulation is then required and six-terminal switching is readily applicable, as shown by the windings of those close-ratio, pole-number combinations previously described.

Certain other pole-number combinations, such as eight-poles/12-poles, although seemingly examples of even-cycle modulation, are in fact two sub-multiple combinations, (in the above example twice four-poles/six-poles) which are examples of odd-cycle modulation; and six-terminal, series/parallel switching is then applicable.

The present embodiment of the invention is concerned with true even-cycle modulation pole-number combinations, for which the use of six-terminal, series/parallel switching is not readily achieved.

Such pole-number combinations are indicated when both the alternative pole-pairs are odd and therefore both the sum and the difference of the pole-pairs are even.

Three typical series of such pole-number combinations are:

| 2-poles/6-poles | 2-poles/10-poles | 2-poles/14-poles |
| 6-poles/10-poles | 6-poles/14-poles | 6-poles/18-poles |
| 10-poles/14-poles | 10-poles/18-poles | 10-poles/22-poles |
| 14-poles/18-poles | 14-poles/22-poles | 14-poles/26-poles |
| and so on | and so on | and so on |

In each example above, the sum or difference of the pole-pair numbers is even and the winding is not divisible into two, discrete and identical components.

By way of example, embodiments of a 10-pole/14-pole and a six-pole/10-pole winding will now be described in detail. It will be noted that the 10-pole/14-pole winding has a similar phase-winding for each phase. The six-pole/10-pole winding has dissimilar phase-windings for each phase.

In the prior disclosures of windings providing speed-changing by pole-amplitude modulation, the distinction has been made between "symmetrical" modulation, for pole-number combinations where neither pole-number is a multiple of "3," and "asymmetrical" modulation, for pole-number combinations where one of the alternative pole-numbers is a multiple of "3." Symmetrical modulation is always the easier to achieve.

The 10-pole/14pole winding is an example of symmetrical modulation. The six-pole/10-pole winding is an example of asymmetrical modulation.

A 10-pole/14-pole Winding in 30 Slots

Referring now to FIG. 1a, there is shown a three-phase winding component in five slots, divided $A = 0$ slots, $B = 3$ slots and $C = 2$ slots. The winding component thus has an unequal number of coils per phase and is not divisible into two equal parts.

The slot numbers are shown at the head of the figure and the coil phases below. The modulation wave is indicated at M and is a two-cycle wave denoting reversal of the coils in slot 2 and in slot 5. The 10-pole layout is shown above and the 14-pole layout is shown below.

The 10-pole phase sequence is ABC, as shown in FIG. 1b. Phase A is a phantom phase.

The 14-pole phase sequence is ACB, as shown by the slot-vector star diagram of FIG. 1c. Phase A is a phantom phase.

One slot represents two poles, which is 360°, for 10 poles. One slot represents 2.8 poles, which is 504°, which is equivalent to 144°, for 14 poles.

FIG. 2 is a winding diagram showing the derivation of a 10-pole/14-pole winding in 15 slots from three winding components of the form shown in FIG. 1a, with relative phase rotation. Thus, the slot numbers are shown at the head of the diagram. The first component below is the component of FIG. 1a arranged with its five coils B, B, B, —C, —C in slots 1, 4, 7, 10 and 13. The second component is of identical form comprising five coils A, A, A, —B, —B arranged in slots 6, 9, 12, 15 and 3, that is at one-third perimeter spacing. The third component is also of identical form comprising five coils C, C, C, —A, —A arranged in slots 11, 14, 2, 5 and 8. The arrows I, II and III show the start of the component winding in each case.

The fourth line shows the resultant of the three components comprising 15 coils in 15 slots.

The modulating wave is shown in each case by the wave M.

The resultant winding is exactly balanced between phases, for both pole-numbers because, despite the unbalance of each component, the resultant has three such components arranged correspondingly for the three phases.

The resultant winding of FIG. 2 is thus derived by the technique described in prior U.S. Pat. No. 1,133,062 and referred to as "symmetrization."

This winding can be switched to provide either 10-poles or 14-poles, according to the modulation wave M, whereby the six coils in slots 3, 4, 8. 9, 13 and 14 are reversed relatively to the nine coils in slots 1, 2, 5, 6, 7, 10, 11, 12 and 15, but this cannot be provided by six-terminal, series/parallel switching, both because the coil number, 15 is odd and because even-cycle modulation is required.

FIG. 3 is a winding diagram showing a 10-pole/14-pole winding in 30 slots, comprising two windings of the form shown in FIG. 2 arranged in alternate slots. Thus, the slot numbers are shown at the head of the diagram. The first line (I) below shows the first component winding of FIG. 2 arranged in the odd-numbered slots. The second line (II) shows the second component winding of FIG. 2 arranged in the even-numbered slots. The second winding has corresponding coils spaced by nine slots, corresponding to three poles for 10-pole working, and therefore reversed in sign. The modulating waves for 14-pole working are shown by the waves M and these are reversed, relatively to each other, because the spacing of nine slots corresponds to 4.2 poles for 14-pole working.

The third line shows the resultant winding in 30 slots for 10-pole working, with a 24 half-cycle modulating wave M, for 14-pole working. The coil-patch is three slots.

For the 10-pole connection, two parallel paths are possible in each phase, each path comprising five coils, one path including all the coils to be reversed for 14-pole working and the other path including all the coils not reversed.

The arrangement is shown in FIG. 4. For each phase, the coils not reversed are here connected in star between terminals A1, B1 and C1. The remaining coils are connected, respectively between terminals A1, A2; B1, B2 and C1, C2. Parallel-star connection provides 10-pole working and series-star connection provides reversal of the required five coils of each phase for 14-pole working.

In some cases parallel-star/series delta switching would be used.

The winding factor for 10-poles is 0.872 and for 14-poles is 0.658. The flux density ratio for 10-poles/14-poles is 1.08:1.00. Opposite supply phase-sequences provide the same sense of rotation for the two pole-numbers.

The general rule for the combination of two such balanced windings is that coils of each component winding in turn shall be located in alternate slots of the stator core. Corresponding coils of the two component windings are spaced apart around the core perimeter by a number of slots which corresponds exactly to an odd (or even) number of pole-pitches for that pole-number for which parallel connection of the winding sections is required. The chosen slot spacing must further be closely equal to an even (or odd, respectively) number of pole-pitches for the alternative pole number for which the winding sections are series-connected.

Exact, integral pole-pitch spacing is necessary for the parallel connection. Approximate, integral pole-pitch spacing, only, is necessary for the series connection, since the requirement is that the e.m.f.'s of the two halves of the winding shall be as nearly additive as possible.

The pole-pitch spacing must be odd for one pole-number and even for the other, so that the modulating waves will be of opposite sign. This fact then makes equal the number of coils reversed on modulation and the number not reversed. This latter fact provides two winding sections of equal numbers of coils and makes possible six-terminal series/parallel switching, the prior assumption being made that the two component windings are themselves balanced, as by the techniques described, so that the coils reversed and the coils not reversed on modulation are of equal e.m.f. to each other.

Referring again to FIGS. 3 and 4, it will be noted that this design procedure provides a winding the layout of which differs between the first and second halves of the winding. This is not in accordance with earlier-described PAM speed-changing windings. Nevertheless, the three phase-windings have identical coil-grouping and are relatively displaced by one-third of the winding perimeter.

One modification of the method disclosed is of value for certain pole-number combinations.

Two 15-slot windings were interleaved in alternate stator slots in the winding of FIG. 3, to make possible parallel connection. It follows that all coils of one winding occupy odd-numbered slots and all coils of the other winding occupy even-numbered slots. It further follows that all possible spacings of the two windings are one slot, three slots, five slots and so on, that is, always an odd number. This slot spacing further needed to represent an exact number of pole-pitches for the pole-number provided by parallel connection.

In a case, for example, whre two 36-slot 6-pole windings are to be combined in a 72-slot stator, the ideal spacing is one pole-pitch which corresponds to 12 slots, which is not directly applicable.

It is then permissible, however, to use 13 slots spacing for the first half of the windings and 11 slots spacing for the second half.

A Six-pole/10-pole Winding in 54 slots

It has been explained above, in relation to the 10-pole/14-pole winding, how two component windings are interleaved to provide for parallel circuits and how the component windings are made up from three winding elements.

The stator frame chosen must thus have a slot-number divisible by "6." Further, one pole-pitch should equal an integral number of slots for the parallel-connected pole-number.

The 54-slot stator chosen in the present example permits of two components each in 27 slots, comprising three three-slot winding elements symmetrised in nine slots and three such nine-slot windings again symmetrised in 27 slots. The two 27-slot windings are interleaved at nine slots spacing, which is one pole-pitch for six-pole working, in parallel-connection.

FIG. 5a shows an elemental, three-slot, six-pole/10-pole winding comprising coils A, A, −C in six-pole arrangement and A, −A, −C in 10-pole arrangement.

FIG. 5B is the corresponding slot vector diagram for six-pole working, showing phase B as a phantom phase.

FIG. 5c is the corresponding slot vector diagram for 10-pole working also showing phase B as a phantom phase.

For six-pole work, one slot represents 360°. For 10-pole working, one slot represents 600° ≡ 240°.

FIG. 6 shows three elemental windings according to FIG. 5a, symmetrised by relative phase-displacement, combined to form a three-phase, six-pole/10-pole winding in nine slots. The relative slot spacing is two slots, as shown by the arrows I, II and III. The spacing of two slots represents 240° for six-poles, which is exact, and 400° ≡ 40° for 10-poles, which represents an error of 20°.

FIG. 7 shows three nine-slot component windings according to FIG. 6, again symmetrised by relative phase-displacement, interleaved to form a three-phase six-pole/10-pole winding in 27 slots. The relative slot spacing is one slot, as shown by the arrows I, II and III. The spacing of one slot represents 40° for six-poles, for which pole-number the component windings are already balanced, and 66.7° for 10-poles, which represents an error of 6.67°.

FIG. 8 shows the final combination of two windings according to FIG. 7 interleaved in alternate slots to form a six-pole/10-pole winding in 54 slots. The relative slot spacing is nine slots, as shown by the arrows I and II. The spacing of nine slots represents one pole-pitch for six-poles and 1.67 pole-pitches for 10-poles. Hence the modulating waves for the two component windings are reversed relatively to one another. The signs of the two component windings are reversed, for one pole-pitch spacing, and the six-pole layout is shown in the lowest line of the diagram. This layout represents a winding requiring a selected half of the winding reversed, according to the total modulating wave shown, which has fundamentally a two-cycle wave, for 10-pole working, so that speed-changing can be effected by six-terminal, series/parallel switching.

The same (or similar) windings in 54 slots can be obtained by interleaving two component windings according to FIG. 6 to provide a 6-pole/10-pole winding in 18 slots capable of speed-changing by series/parallel switching. Three such windings in 18 slots are then symmetrised to provide the required winding in 54 slots.

The possible slot spacings for this final symmetrisation are two-slots, 13-slots, 14-slots and 15-slots. The two-slot spacing gives the most balanced winding and in fact provides again the identical winding as shown in FIG. 8. The alternative 13-slot spacing gives some increase in residual 10-pole unbalance, but a better m.m.f. waveform at 10 poles. The spacings of 14-slots and 15-slots are inferior to either of the above.

A 10-pole/14-pole Winding in 60 Slots

The process, described in relation to the six-pole/10-pole winding above, of interleaving two component windings to provide parallel circuits which are suitable for six-terminal, series/parallel switching may also be used to provide a 10-pole/14-pole winding in 60 slots. In this case, the two components interleaved are themselves suitable for six-terminal, series/parallel switching.

A 10-pole/14-Pole winding in 60 slots is more widely required than the 10-pole/14-pole winding in 30 slots described above. It would not be possible to interleave any two 10-pole/14-pole, 30-slot windings, because the spacing required might not correspond to an odd number of slots. It is possible to interleave two 30-slot windings only if six terminal, series/parallel switching is possible with the component 30-slot winding.

FIG. 9 shows the method of interleaving. Component I is the 10-pole/14-pole winding of FIG. 3 with its coils arranged in the odd-numbered slots of a 60-slot stator frame. Component II is an identical winding arranged in the even-numbered slots with a spacing of five slots and with reversal of sign. The spacing of five slots represents 5/6 pole-pitch for 10-poles and 7/6 pole-pitch for 14 poles. Both modulating waves have the same sign.

The resultant winding in 60 slots is shown below in FIG.9.

Figure 10:
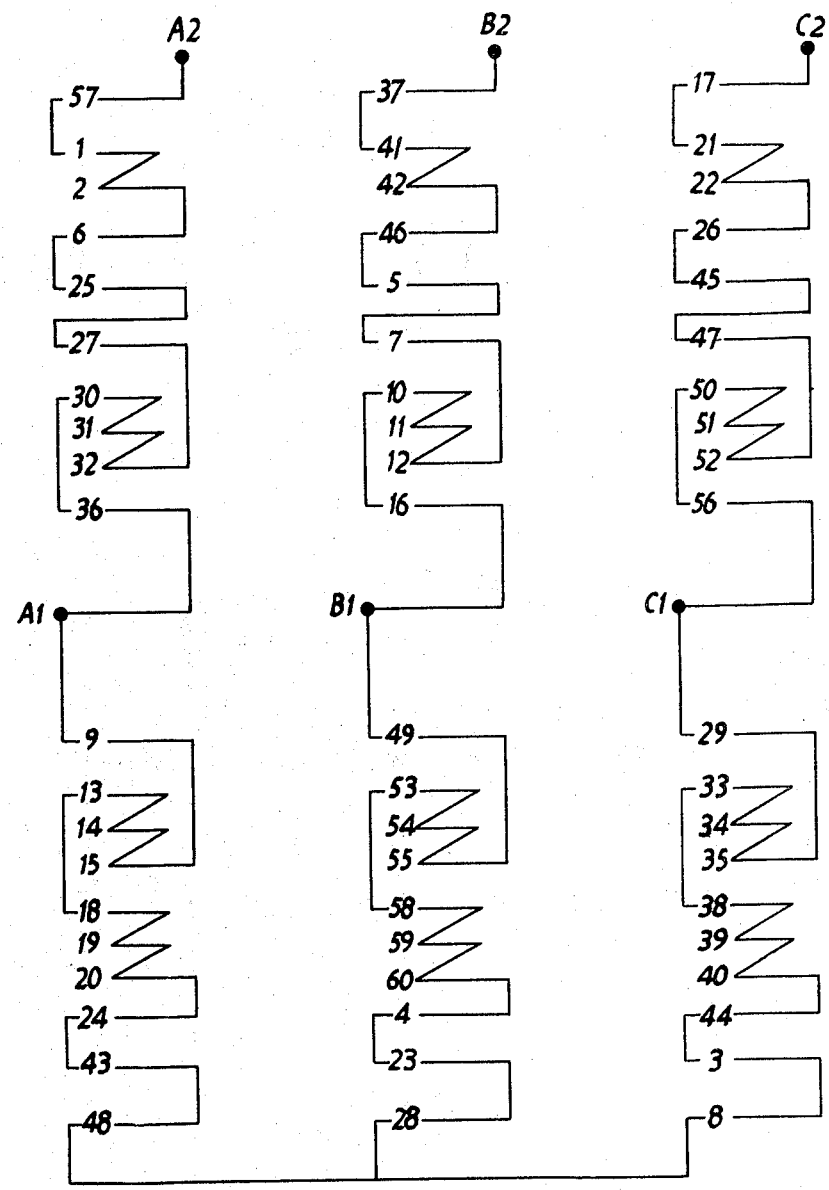
FIG. 10 is a winding diagram of the 10-pole/14-pole, 60 slot winding of FIG. 9.

The winding diagram of the resultant winding is shown in FIG.10. The three phase-windings are connected in star for both pole-numbers. The half phase-windings which are not reversed on modulation are connected between terminals A1, B1 and C1 and a permanent star point. The half phase-windings which are reversed for 14-pole working are connected between terminals A1, A2; B1, B2 and C1, C2.

The coil-pitch is six slots. The winding factor for 10 poles is then 0.842 and for 14 poles is 0.650. The air-gap flux-density ratio for 20-poles/14-poles is 1.10:1.00.

An eight-pole/12-pole Winding in 90 Slots

A further example of the interleaving of two balanced component windings to permit of six terminal, series/parallel switching is the interleaving of two eight-pole/12-pole windings in 45 slots to provide a resultant winding in 90 slots.

FIG.11 shown an eight-pole/12-pole winding in 45 slots. Each phase occupies 15 slots and the eight-pole winding, grouped 2-2-2-2-2-2-2-1 per phase is a symmetrical winding. For 12-pole working, 24 coils require to be reversed and 21 coils do not. The winding is thus totally unsuitable for series/parallel switching.

FIG.12 shows, as component I, the winding of FIG.11 arranged with coils in the odd-numbered slots. An identical winding is interleaved in the even-numbered slots at 23-slots spacing. The spacing corresponds closely to two poles with respect to eight poles. The ideal spacing of 22½ slots is not possible and 23 slots is the nearest odd number. The signs of the windings are unchanged. The spacing of 23 slots is closely equivalent to three-pole spacing with respect to 12 poles and the two modulating waves are consequently of opposite sign.

The resultant winding in 90 slots is shown in FIG.12 also. The coil-pitch is eight slots.

Figure 13:
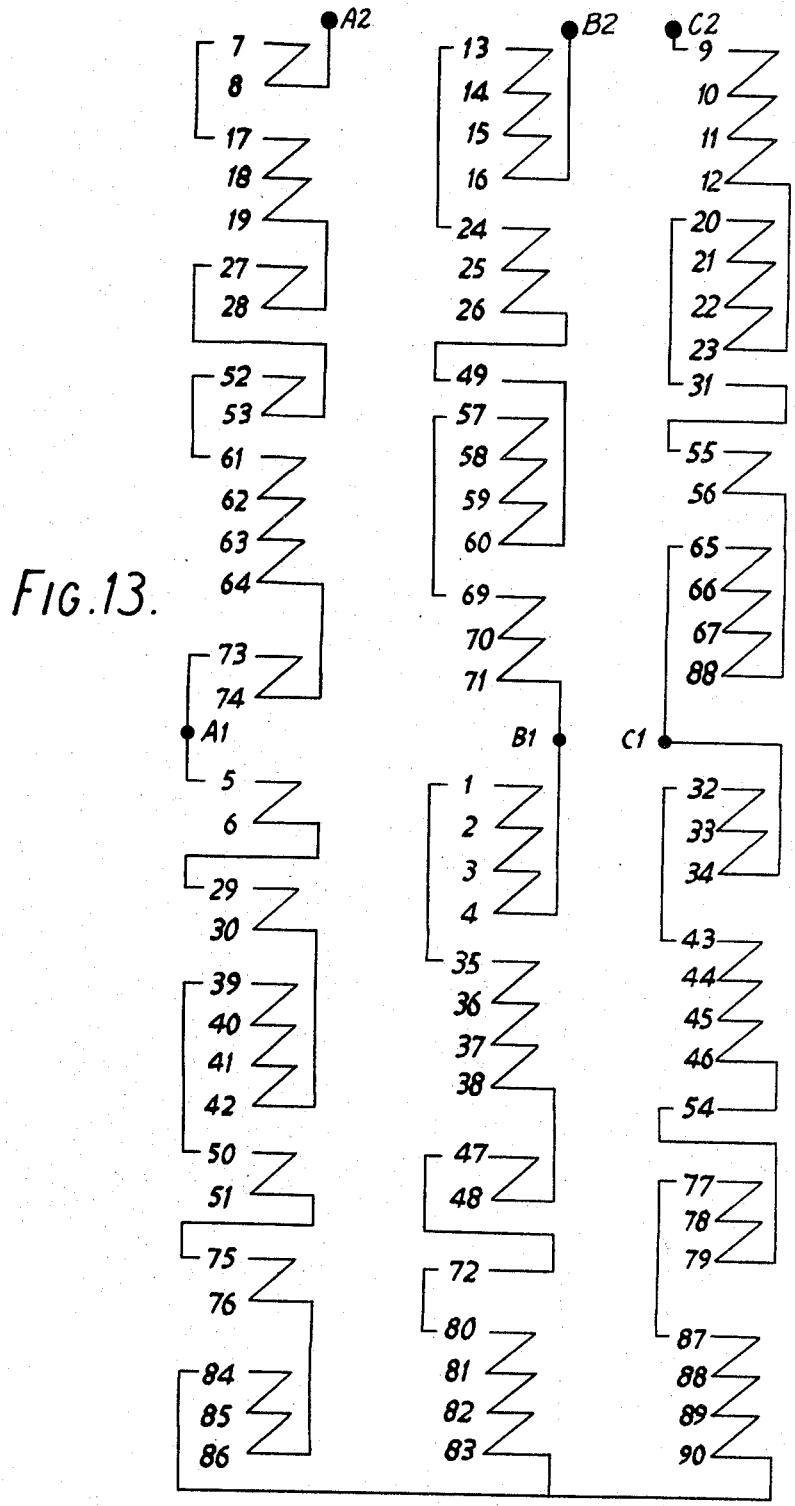
FIG. 13 is a winding diagram of the eight-pole/12-pole winding in 90 slots of FIG. 12.

FIG.13 is a winding diagram of the 90-slot winding of FIG.12. The phase-windings are connected in star for both pole-numbers. The half phase-windings which are not reversed on modulation are connected between terminals A1, B1 and C1 and a permanent star point. The half phase-windings which are reversed for 12-pole working are connected between terminals A1, A2; B1, B2 and C1, C2.

The coil-pitch of eight slots gives a winding factor for eight poles of 0.856 and for 12 poles of 0.631. The air-gap flux-density ratio for eight-pole/12-poles is 0.98:1.00.

A 10-pole/14-pole Winding in 48 Slots

In the winding examples described above, the purpose of interleaving two balanced component windings is to provide equal numbers of coils requiring reversal for the modulated pole-number and not requiring reversal, respectively, so as to permit of series/parallel switching.

One exception was the 10-pole/14-pole winding in 60 slots, for which the two 30-slot components already permitted of series/parallel switching.

Any such interleaving of two identical balanced windings will always provide a balanced resultant winding, whatever the spacing of the components. In such cases, according to another form of the invention, it is possible to select the spacing to improve the m.m.f. waveform.

Thus, in the 10-pole/14-pole, 60-slot example, referred to, the chosen spacing of five slots, which is 5/6 pole-pitch for 10 poles and 7/6 pole-pitch for 14 poles, gives a winding which is superior to a 30-slot winding doubled in consecutive slots, in relation to m.m.f. waveform.

The method of interleaving two, or more, identical windings, together with the choice of a preferred slot-spacing, or spacings, may be used in any circumstances where a balanced, three-phase, or polyphase, winding in a given number of slots, permitting of series/parallel switching is known, and a winding for the same alternative pole-numbers in twice, or a multiple of, the given number of slots is required.

The m.m.f. waveform can always be improved by this method, relatively to a winding resulting from mere doubling, or multiplying, the component winding in consecutive slots.

This method for improving m.m.f. waveform may be extended to cases where even-cycle modulation is applied to each phase of a three-phase, or polyphase, winding to provide a speed-changing winding with series/parallel switching in which, however, the parallel paths have some inequality either of m.m.f. magnitude or of phase.

Two such component windings may then be interleaved in such a way that the defects of the components tend to neutralise each other.

Examples will be given in a 10-pole/14-pole winding in 48 slots, shown in FIGS. 14 and 15, and in a modified form of this winding, shown in FIGS. 18 and 19.

Figure 14:
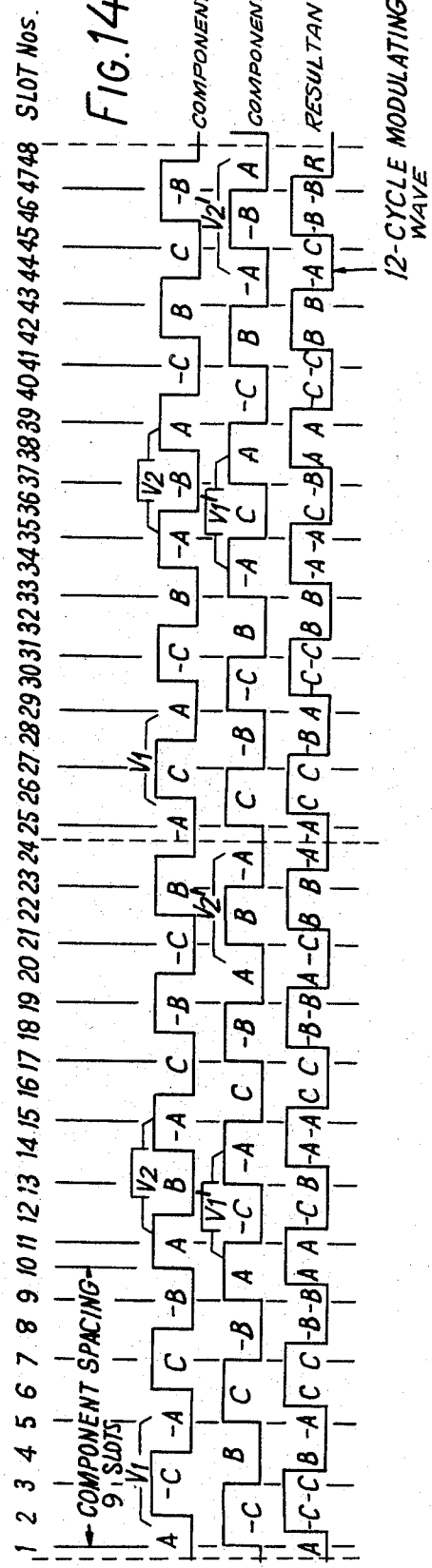
FIG. 14 is a layout diagram of a 10-pole/14-pole winding in 48 slots, comprising two component windings in 24 slots.

FIG. 14 shows a first 10-pole/14-pole component wound in the odd-numbered slots of a 48-slot stator frame and an identical winding interleaved in the even-numbered slots with nine-slot spacing between the components. For each component winding, the coil-grouping is 1-1-1-1-0-1-1-1-1-0 for each phase-winding.

P.A.M. theory shows that alternate coils of each component require to be reversed for 14-pole working, giving four-cycle modulation per phase. Series/parallel switching of the whole winding is not possible. Self-paralleling of each half-winding is possible but causes a phase error between the two parallel paths.

The coils corresponding to each vector are marked in FIG. 14 for phase A only by the brackets V1, V2 and V1$^1$, V2$^1$. In addition, those coils, and vectors, requiring reversal for 14-pole working are indicated by the rectangular brackets within the said vector brackets.

The slot-spacing of nine slots represents 1.87 poles for 10 poles and 2.63 poles for 14 poles. The components are therefore added for 10 poles and subtracted for 14 poles. The components are thus of the same sign and the modulation waves are reversed relatively to each other. Phases B & C are similarly arranged.

The resultant winding in 48 slots is shown and the resultant modulating wave is a regular 12-cycle wave.

The coil pitch is three slots, corresponding to 5/8 full-pitch for 10 poles and 7/8 full-pitch for 14 poles. The winding factor is 0.782 for 10 poles and 0.780 for 14 poles. The air-gap, flux-density ratio 10-poles/14-poles, when connected parallel-star/series-delta is 0.823:1.

Figure 15:
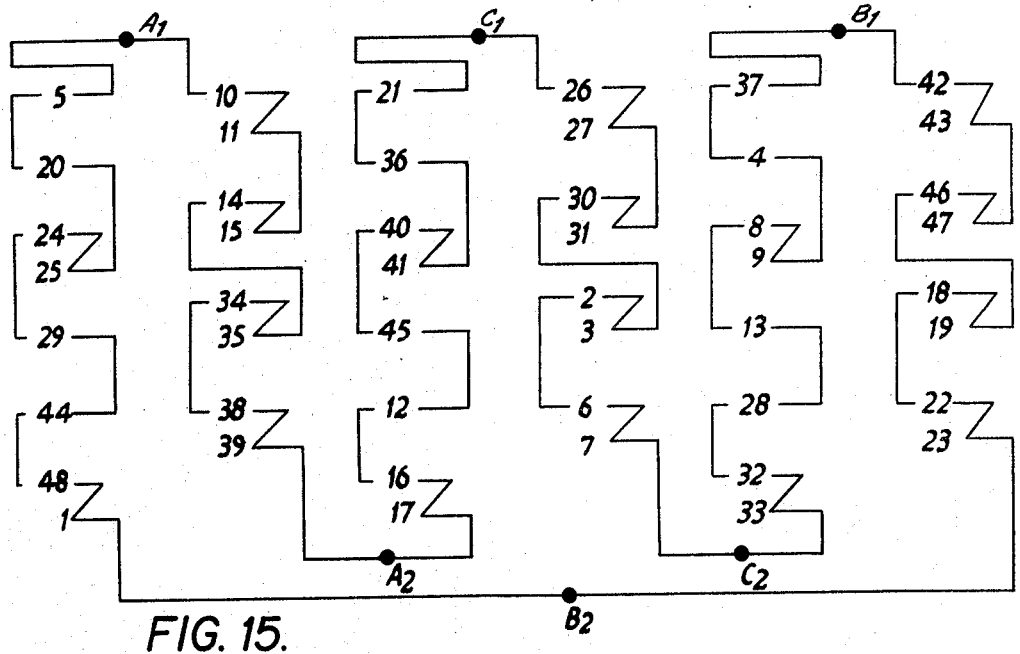
FIG. 15 is a winding diagram of the 10-pole/14-pole winding of FIG. 14.

The winding diagram for this winding is shown in FIG. 15 and provides two-parallel-star connections for 10 poles and series-delta connections for 14 poles.

Figure 16:
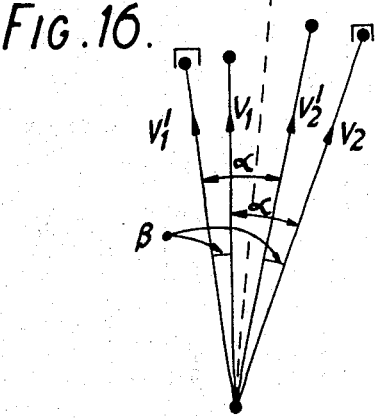
FIG. 16 is a vector diagram for four coils, two of which are reversed on modulation, relating to the winding of FIG. 14.

The vector relationships in this winding, corresponding to the vectors shown in FIG. 14, are shown in FIG. 16. Vectors V1 and V2 represent the first two quarters of one component and the vectors V1$^1$ and V2$^1$ represent the first two quarters of the other component. The diagram shown represents one-half of the resultant winding. As in FIG. 14, the rectangular brackets denote the coils to be connected in series for 10 poles and reversed for 14 poles.

If the angle $\beta$ were zero, the vectors V1 + V2$^1$ would exactly equal the vectors V1$^1$ + V2.

The practical requirement is so to arrange the two component windings that the first quarter of the one component is connected in series with the second quarter of the other component, and vice versa. By this arrangement, the unequal vectors are nearly equalised in aggregate.

Figure 17:
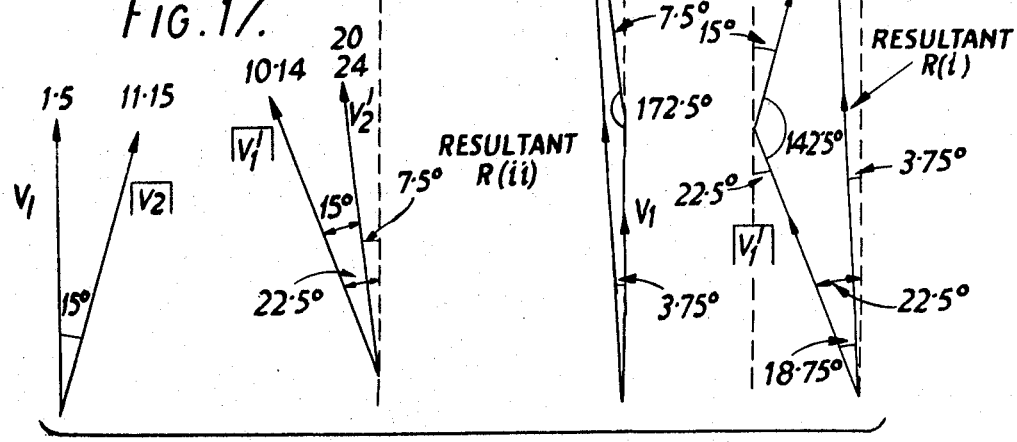
FIG. 17 is a vector diagram of parallel circuits, relating to the winding of FIG. 14.

FIG. 17 shows, to scale, the phase A vectors for the winding of FIG. 14. The vectors for Component I are shown at the left of FIG. 17 and the vectors for Component II are next to the right and referenced by a single prime. Vectors V1 and V2 are equal numerically and are spaced apart by 10 slots. Vectors V1$^1$ and V2$^1$ are spaced from vectors V1 and V2 by nine slots.

The resultant vectors are co-phasal, but vector R($i$) is proportional to sin 71.2° = 0.947 and vector R($ii$) is proportional to sin 86.2° = 0.998.

Each phase-winding has been modulated by an irregular two-cycle modulating wave, this number being the difference of the pole-pair numbers (7−5=2). The winding as a whole has been modulated by a 12-cycle wave, which corresponds to the sum of the pole-pair numbers (7+5=12).

It is to be noted that the whole modulation process has been carried out dealing with only the first half of the resultant winding of FIG. 14. The second half of the winding is treated in the same way. For even-cycle modulation of the phase-by-phase type, slot vector computation needs to be applied to one-half of the winding only, when the winding is symmetrical and the three phase-windings are identical.

This requirement is in distinction to that for the 10-pole/14-pole winding in 30 slots, shown in FIG. 3, where the interleaving of the two components is to provide for parallel circuits.

In design practice, it is seldom that the slot-spacing of the components can be made exact for both pole-numbers because the slot-number must be integral. The greater the slot-number, the closer the approximation possible with uniform component spacing.

Figure 18:
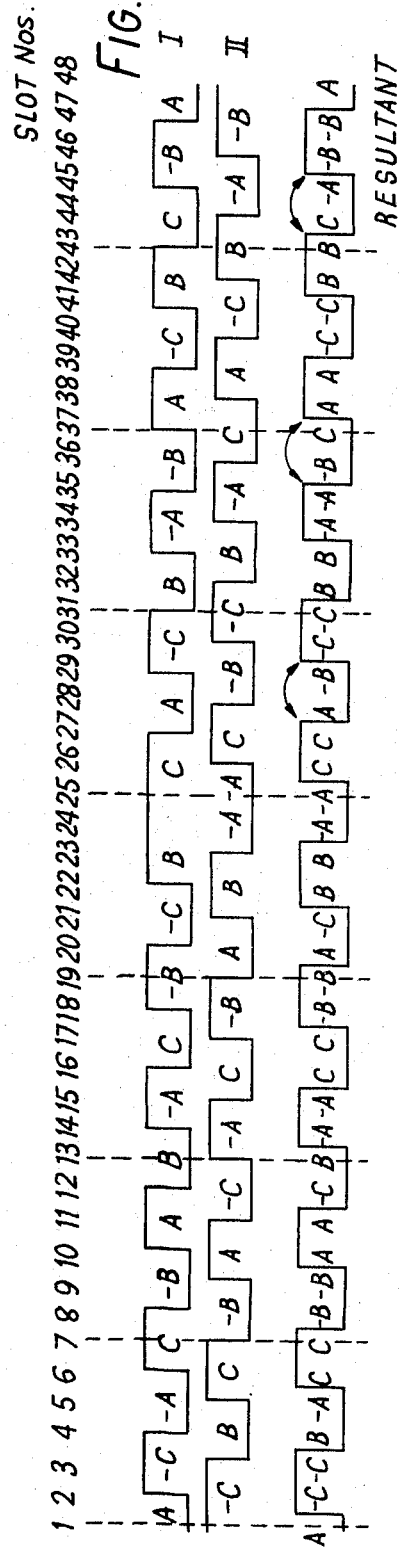
FIG. 18 is a layout diagram of an alternative 10-pole/14-pole winding in 48 slots.

A method of closer approximation, using different component spacings for the first and second halves of the component windings, is shown in FIG.18.

In FIG.18, the first half of the first component is arranged in the odd-numbered slots, as in FIG.14. Similarly, one half of the second component is arranged in the even-numbered slots 2 – 24. The occupancy of slots 1 – 24 is thus unchanged.

The second half of the first component, placed in odd-numbered slots 25 – 47 in FIG.14, are now placed in even-numbered slots 26 – 48. The half of the second component, placed in slots 26 – 48 in FIG.14, are now placed in slots 25 – 47. The slot-spacing is then nine slots for the first half and seven slots for the second half. The new resultant winding, shown in FIG.18, has three pairs of coils interchanged, as indicated by the curved arrows, compared with the original winding shown in FIG.14.

This process changes the angle $\beta$, see FIG.16, for the two halves of the resultant winding.

Figure 19:
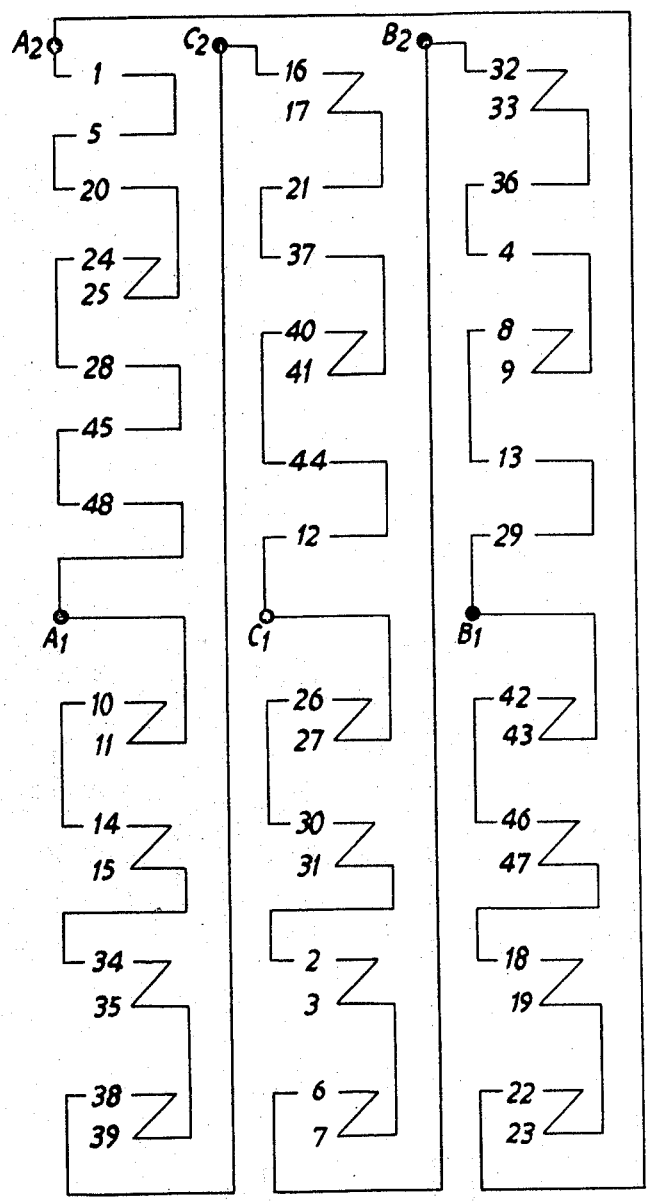
FIG. 19 is a winding diagram of the 10-pole/14-pole winding of FIG. 18.

FIG.19 shows the winding diagram of the winding of FIG.18. The coil-pitch is three slots, as for FIG.15. The connections shown provide for parallel-star connection for 10 poles and series-delta connection for 14 poles.

The winding factor for 10 poles is 0.721 and for 14 poles is 0.816. The air-gap, flux-density ratio 10 poles/14 poles is 0.935:1.

A 20-pole/two-pole Winding in 36 Slots

Further examples will now be given of the interleaving of two component windings to provide a resultant winding with improved properties.

FIG.20 is a layout diagram of a 20-pole/two-pole winding in 36 slots, described in U.S. Pat. No. 968,988. The coil-pitch is nine slots and 20-pole working is provided by a regular nine-cycle modulating wave occupying two slots per half-cycle, as shown.

The winding factor for 20 poles is 0.735 and for two poles is 0.675. The air-gap, flux-density ratio for two poles/20 poles is 0.218:1. The spread factor for 20 poles is 0.735 and for two poles is 0.955. FIG.21 shows a two-pole winding in 18 slots. If the corresponding nine-cycle modulating wave shown is applied to this winding, to provide 20-poles, the spread factor for 20 poles is increased to 0.96.

FIG.22 is a layout diagram showing the component winding of FIG.21 arranged in the odd-numbered slots of a 36-slot frame. An identical winding, spaced by three slots as shown by the arrows I and II, is interleaved in the even-numbered slots.

The resultant 2-pole/20-pole, winding in 36 slots, with a nine-cycle modulating wave, is shown below in FIG.22.

For the winding of FIG.22, the resultant spread factor for 20 poles is 0.831 and for two poles is 0.927. With the same coil-pitch of nine slots, the resultant winding factor for 20 poles is 0.831 and for two poles is 0.655. The air-gap, flux-density ratio for two poles/20 poles is 0.254:1, for parallel-star/series-star switching.

Compared with the winding of FIG.20, the spread factor for 20 poles has been raised from 0.735 to 0.831 and for two poles it has been reduced from 0.955 to 0.927, both these changes being desirable.

A 2-pole/24-pole Winding in 36 Slots

The same method of interleaving two component windings to provide a resultant winding of improved characteristics can also be applied to asymmetrical windings, that is, windings for which one pole-number is a multiple of "3" and the overall modulation wave does not comprise an even multiple of "3" half-waves.

In cases where the pole-number which is a multiple of "3" is the larger of the alternative pole-numbers, the required modulating wave may be devised for a winding of the same pole-number combination, but in one-half the total slots, by the slot-vector star method, and two such windings interleaved, at a preferred slot-spacing, in a frame with the total number of slots.

FIG.23 is a layout diagram of a two-pole winding in 18 slots showing an irregular (13-cycle) modulating wave providing modulation products of $2 \pm 26$ poles, that is 28- poles and 24-poles. The phase sequence is ABC for two poles and ACB for 24 poles, after modulation.

FIG.24 shows at I the winding of FIG.23 arranged in the odd-numbered slots of a 36-slot frame and, at II, an identical winding interleaved in the even-numbered slots at 15 slots spacing, as shown by the arrows I and II. Below is shown the resultant two-pole/24-pole winding in 36 slots, with the overall modulation wave of 13 cycles. The coil-pitch is 13 slots.

The two component windings are connected in reverse-series for form a two-pole winding, and the modulating waves are opposed. The spacing of 15 slots corresponds to exactly 10 poles for 24-pole working and 150° for two-pole working. The components are therefore additive for both pole-numbers, when the signs of the two components are opposed in the two-pole connection, and the modulating waves are also opposed.

The coil-pitch of 13 slots is 13/18 full-pitch for two poles and is equivalent to 2/3 full-pitch for 24 poles. It is almost equivalent to 10 times full-pitch for 28 poles and the parasitic 28-pole resultant vanishes.

The modulating wave cannot be uniform, because the slot-number, 36, is not divisible by 26, the number of half-cycles of the modulating wave. Nevertheless, the modulating wave is satisfactorily uniform.

The negative sign for the modulated pole-number indicates the reverse sense of rotation at 24-pole working, for the same supply sequence.

We claim:

1. A three-phase, alternating-current, speed-changing dynamo electric machine, in which pole-changing is effected by pole-amplitude modulation, having a composite three-phase stator winding comprising two similar component windings each with three phase-windings and having the corresponding phase-windings of the component windings connected together as a phase-winding of the composite winding and having corresponding phase-windings of the two component windings spaced apart from each other around the stator winding periphery.

2. An electric machine as claimed in claim 1, in which pole-changing is effected by an even-cycle, overall modulation wave, each of the two said component windings comprising a substantially balanced three-phase winding and, in each of the three phase-windings of the composite stator winding, an equal number of coils are reversed in current-carrying sense as the number of coils remaining unchanged, for speed-changing of the machine.

3. A three-phase, alternating-current, speed-changing dynamo electric machine, in which pole-changing is effected by pole-amplitude modulation, having a composite three-phase stator winding comprising two similar component windings each with three phase-windings and having the corresponding phase-windings of the component windings connected together as a phase-winding of the composite winding and having corresponding phase-windings of the two component windings spaced apart from each other around the stator winding periphery, in which pole-changing is effected by an even-cycle, overall modulation wave, each of the two said component windings comprising a substantially balanced three-phase winding and, in each of the three phase-windings of the composite stator winding, an equal number of coils are reversed in current-carrying sense as the number of coils remaining unchanged, for speed-changing of the machine, and in which each of the two said component windings is made up from three unbalanced winding elements, the three said elements being arranged with corresponding coil groups in the three phases, respectively, of the component winding.

4. A three-phase, alternating-current, speed-changing dynamo electric machine, in which pole-changing is effected by pole-amplitude modulation, having a composite three-phase stator winding comprising two similar component windings each with three phase-windings and having the corresponding phase-windings of the component windings connected together as a phase-winding of the composite winding and having corresponding phase-windings of the two component windings spaced apart from each other around the stator winding periphery, each of the two said component windings comprising a substantially balanced three-phase winding and, in each of the three phase-windings of the composite stator winding, an equal number of coils being reversible in current-carrying sense as the number of coils remaining unchanged, for speed-changing of the machine, the said composite stator winding being wound in a stator having a slot-number divisible by "6" and comprising coils of the said two component windings located in alternate slots thereof.

5. An electric machine as claimed in claim 4, in which corresponding coils of the two component windings are spaced apart around the winding periphery by a uniform number of stator slots substantially equal to a whole number of pole-pitches for both pole-numbers of the machine, an odd number for one pole-number and an even number for the other.

6. An electric machine as claimed in claim 4, in which corresponding coils of the two component windings are spaced apart by an odd number of stator slots, the slot spacing for the first half of each component winding differing by two slots from the slot spacing for the second half of each component winding.

7. An electric machine as claimed in claim 4, in which each of the two said component windings is made up from three sub-component windings, the three sub-component windings being arranged with corresponding coil groups in the three phases, respectively, of the component winding and each of the three said sub-component windings is made up from three unbalanced winding elements, the three said elements being arranged with corresponding coils in the three phases, respectively, of the sub-component winding.

8. An electric machine as claimed in claim 4, in which each of the said two component windings comprises a substantially balanced three-phase, pole-changing winding, corresponding coils of the two component windings being uniformly spaced apart in the composite winding by a number of stator slots which approximates to a single pole-pitch for both the alternative pole-numbers.

9. An electric machine as claimed in claim 4, in which each of the said two component windings comprises a substantially balanced three-phase, pole-changing winding, corresponding coils of the two component windings being uniformly spaced apart in the composite winding by a number of stator slots which is substantially an integral number of pole-pitches for both the alternative pole-numbers, corresponding coils of the two said component windings being energised in the same current-carrying sense when the said integral number is even and being energised in the opposite current-carrying sense when the said integral number is odd.

10. An electric machine as claimed in claim 4, in which each of the said two component windings comprises a substantially balanced three-phase, pole-changing winding, corresponding coils of the two component windings being uniformly spaced apart in the composite winding by a number of stator slots which is substantially an integral and even number of pole-pitches of an unwanted harmonic pole-number, corresponding coils of the two component windings being energised in opposite current-carrying sense. sense.

11. A three-phase, alternating-current, speed-changing dynamo electric machine, in which pole-changing is effected by pole-amplitude modulation, having a composite three-phase stator winding comprising two similar component windings each with three phase-windings and having the corresponding phase-windings of the component windings connected together as a phase-winding of the composite winding and having corresponding phase-windings of the two component windings spaced apart from each other around the stator winding periphery, in which each of the said two component windings comprises a substantially balanced three-phase winding in which pole-changing is effected by an odd-cycle overall modulation wave and by six-terminal series/parallel switching of phase-winding parts of the component winding.

12. A three-phase, alternating-current, speed-changing dynamo electric machine, in which pole-changing is effected by pole-amplitude modulation, having a composite three-phase stator winding comprising two similar component windings each with three phase-windings and having the corresponding phase-windings of the component windings connected together as a phase-winding of the composite winding and having corresponding phase-windings of the two component windings spaced apart from each other around the stator winding periphery, in which each of the said two component windings comprises a substantially balanced three-phase, pole-changing winding, for which an unequal number of coils require to be reversed in current-carrying sense as the number of coils requiring to remain unchanged, for pole-changing, and in which, for speed-changing of the said machine, selected coils of one said component winding are reversed in current-carrying sense whereas the corresponding coils of the other said component windings are not reversed, thereby providing equal numbers of reversed coils and not reversed coils in the said composite winding.

13. An electric machine as claimed in claim 4, in which each of the said two component windings comprises a substantially balanced three-phase winding in which pole-changing is effected by an even-cycle overall modulation wave and by six-terminal series/parallel switching of phase-winding parts of the component winding.

* * * * *